United States Patent
Ito et al.

(10) Patent No.: US 8,218,814 B2
(45) Date of Patent: Jul. 10, 2012

(54) IMAGE DATA PROCESSING APPARATUS AND METHOD FOR OBJECT DETECTION AND JUDGING SUSPICIOUS OBJECTS

(75) Inventors: Mitsue Ito, Kodaira (JP); Wataru Ito, Nishitokyo (JP); Kazuya Takahashi, Mito (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 1134 days.

(21) Appl. No.: 12/057,823

(22) Filed: Mar. 28, 2008

(65) Prior Publication Data
US 2008/0247601 A1   Oct. 9, 2008

(30) Foreign Application Priority Data
Mar. 30, 2007   (JP) ................. 2007-091109

(51) Int. Cl.
  *G06K 9/00* (2006.01)
  *G06K 9/36* (2006.01)
  *H04N 7/18* (2006.01)
(52) U.S. Cl. ......... 382/103; 382/289; 348/143; 348/152
(58) Field of Classification Search .............. 382/100, 382/103, 190, 286, 289; 348/135, 142, 143, 348/152; 340/540
See application file for complete search history.

(56) References Cited

U.S. PATENT DOCUMENTS

| | | | |
|---|---|---|---|
| 4,737,847 A * | 4/1988 | Araki et al. ................. | 348/161 |
| 5,638,116 A * | 6/1997 | Shimoura et al. ............ | 348/118 |
| 6,445,409 B1 * | 9/2002 | Ito et al. ..................... | 348/155 |
| 6,678,393 B1 * | 1/2004 | Dunton et al. .............. | 382/103 |
| 6,985,609 B2 * | 1/2006 | Shibuya ..................... | 382/118 |
| 7,028,269 B1 * | 4/2006 | Cohen-Solal et al. ...... | 715/863 |
| 7,644,059 B2 * | 1/2010 | Goerick et al. ............. | 706/62 |
| 7,660,437 B2 * | 2/2010 | Breed ......................... | 382/104 |
| 7,742,620 B2 * | 6/2010 | Chen et al. .................. | 382/103 |
| 8,111,304 B2 * | 2/2012 | Ohtsuka et al. ............. | 348/231.6 |
| 2004/0032494 A1 * | 2/2004 | Ito et al. ..................... | 348/152 |
| 2007/0008411 A1 * | 1/2007 | Shibata et al. .............. | 348/152 |
| 2008/0166052 A1 * | 7/2008 | Hatano ....................... | 382/190 |
| 2010/0080418 A1 * | 4/2010 | Ito .............................. | 382/103 |

FOREIGN PATENT DOCUMENTS
JP   2000-105835   4/2000
* cited by examiner

*Primary Examiner* — Jason M Repko
*Assistant Examiner* — Mia M Thomas
(74) *Attorney, Agent, or Firm* — Brundidge & Stanger, P.C.

(57) ABSTRACT

An image processing apparatus such as a monitor system for executing image processing to present a suspicious object effectively. An object detecting unit detects an object contained in an image, an associating unit associates a plurality of objects detected with the object detecting unit, with each other, and an evaluating unit evaluates (e.g., evaluation as being suspicious) an object detected by the object detecting unit, and an association evaluating unit evaluates another object associated by the associating unit with the object evaluated by the evaluating unit, in accordance with the evaluation made by the evaluating unit.

12 Claims, 7 Drawing Sheets

IMAGE DATA PROCESSING APPARATUS AND METHOD FOR OBJECT DETECTION AND JUDGING SUSPICIOUS OBJECTS

INCORPORATION BY REFERENCE

The present application claims priority from Japanese application JP 2007-091109 filed on Mar. 30, 2007, the content of which is hereby incorporated by reference into this application.

BACKGROUND OF THE INVENTION

The present invention relates to an image processing apparatus, and more particularly to an image processing apparatus for associating a plurality of objects in an image with each other and an image processing apparatus.

An object entering an area (a target monitoring area) is monitored by using an imaging apparatus such as a television camera (TV camera). Techniques of automatic monitor not by a human guard but by an apparatus or a system have been investigated.

For example, U.S. Pat. No. 6,445,409 (JP-A-2000-105835), the disclosure of which is hereby incorporated into this application by reference, describes that an input image captured with a camera is compared with a reference background image formed in advance, i.e., an image not showing an object to be detected, an area in the input image where a luminance value changes is detected by obtaining a difference between luminance values of each pixel, and a change in the position of the detected luminance value change area is judged for each processing frame to detect a suspicious person or an abnormal state in the target monitoring area. This process of detecting an area in the input image where a luminance value changes is called a subtraction method which is widely used conventionally.

Figure 8:
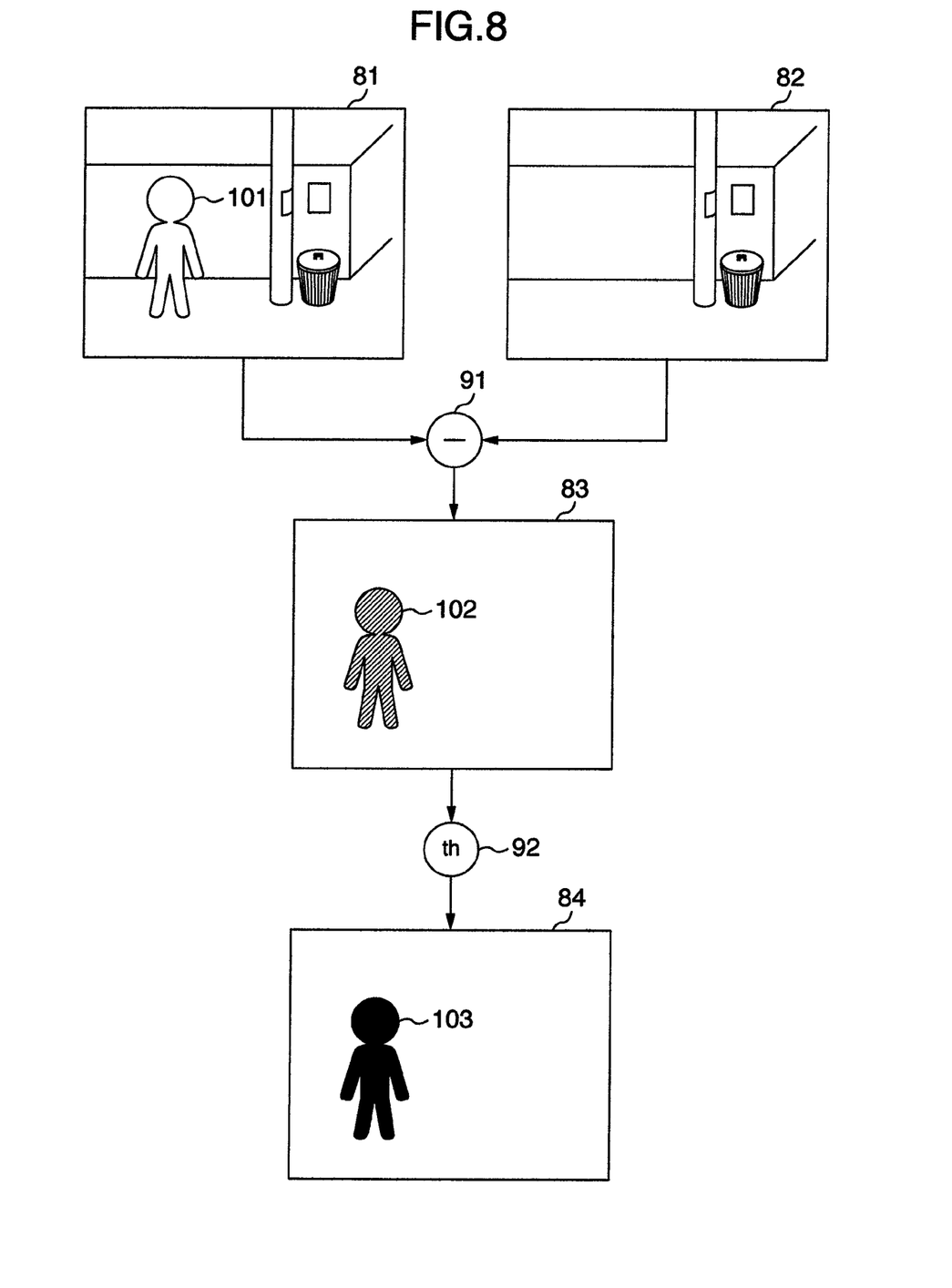
FIG. 8 is a diagram showing an example of how a luminance value change area is detected by a subtraction method.
Figure 9:
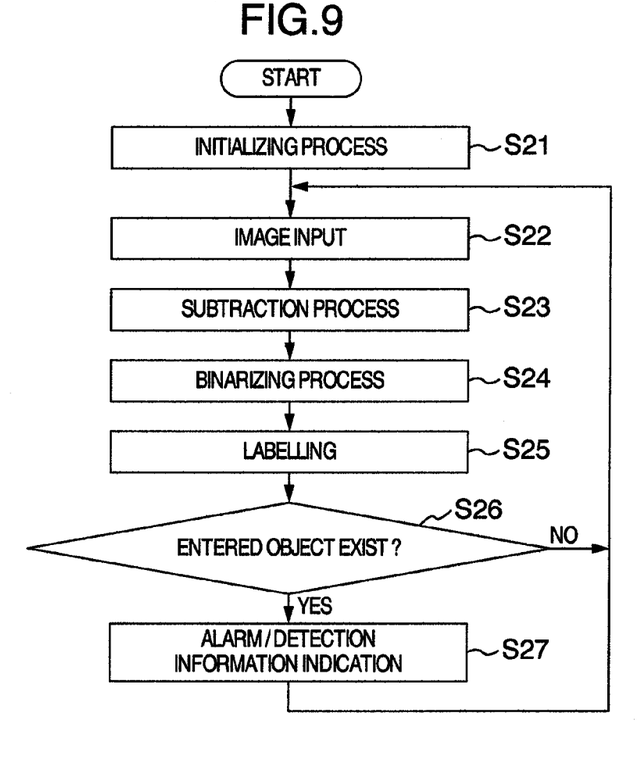
FIG. 9 is a diagram showing an example of the procedure of a typical process of a monitoring method using the subtraction method.

With reference to FIGS. 8 and 9, description will be made on a process of the subtraction method.

FIG. 8 illustrates an example of how a luminance value change area is detected by the subtraction method. In this example, a luminance value change area in an input image sequentially input from an imaging apparatus is detected by the subtraction method.

An image 81 is an image sequentially input from an imaging apparatus, and an image 82 is an image prepared in advance and not showing an object to be detected (a reference background image). A subtractor 91 input with these two images 81 and 82 calculates a luminance value difference of each pixel to obtain a difference image 83.

Next, a binarizer 92 input with the difference image 83 executes a threshold value process for each pixel value of the difference image 83 by using a threshold value Th (e.g., an experimentally determined value, and Th=20). The binarizer obtains a binarized image 84 by setting a pixel value smaller than the threshold value Th to "0" and setting a pixel value not smaller than Th to "255". In this manner, the subtractor 91 calculates an object 101 of a human shape taken in the input image 81 as an area 102 (where a luminance value of the input image changes) where a difference appears, and the binarizer 92 detects this area as an image 103 having a pixel value of "255".

In this example, a pixel value of each pixel is calculated as eight bits, i.e., one pixel has a value from "0" to "255"

FIG. 9 illustrates an example of the procedure of a typical process of a monitoring method applying the subtraction method.

At an initializing Step, an external apparatus for executing the monitoring method by the subtraction method, variables, an image memory and the like are initialized (Step S21). At an image input Step, an input image of, e.g., 640 horizontal pixels and 480 vertical pixels is acquired from an imaging apparatus (Step S22). At a subtraction Step, a difference image (image 83) between luminance values of each pixel is calculated by comparing the input image (image 81) obtained at the image input Step with the reference background image (image 82) formed in advance (Step S23).

At a binarizing Step, a binarized image (image 84) is obtained by setting to "0" a pixel value (difference value) of the difference image (image 83) obtained at the subtraction Step and having a value smaller than a predetermined threshold value Th (e.g., Th=20) and by setting to "255" a pixel value not smaller than the threshold value Th (Step S24).

Next, at a labeling Step, clusters (image 103 as a change area) of pixels having the pixel value "255" in the binarized image (image 84) obtained at the binarizing Step are detected, and a number is assigned to each cluster to distinguish each cluster (Step S25). At an object existence judging Step, in accordance with the detection conditions such as a size, an area, a speed and a detected position, it is judged whether each labelled change area matches the detection conditions (Step S26). If the change area matches the detection conditions, it is judged that there is an object to be detected, and the flow advances to an alarm/detection information indicating Step (Step S27), whereas if the change area does not match the detection conditions, it is judged that there is no object to be detected, and the flow returns to the image input Step (Step S22).

At the alarm/detection information indicating Step, an existence of the object to be detected is notified to a guard by stimuli such as visual sense, auditory sense, smell sense, touch sense and taste sense, by using at least one means such as a monitor, an alarm lamp and an alarm buzzer (Step S27).

In the monitor system described above, a display device such as a monitor displays an image showing a detected object surrounded by a frame and a motion route, the image paying attention to an object detected under control of a zoom lens and a pan and tilt head of an imaging apparatus.

However, with the monitor system described above, a person (e.g., guard) searches another object associated with a suspicious object. This work is very complicated and inefficient.

More specifically, if a suspicious object is detected in a target monitor area and a guard views this object, the guard is required to view past images recorded in a predetermined image recording apparatus to find another object associated with the detected suspicious object, and to confirm whether the other object is also a suspicious object.

Figure 10:
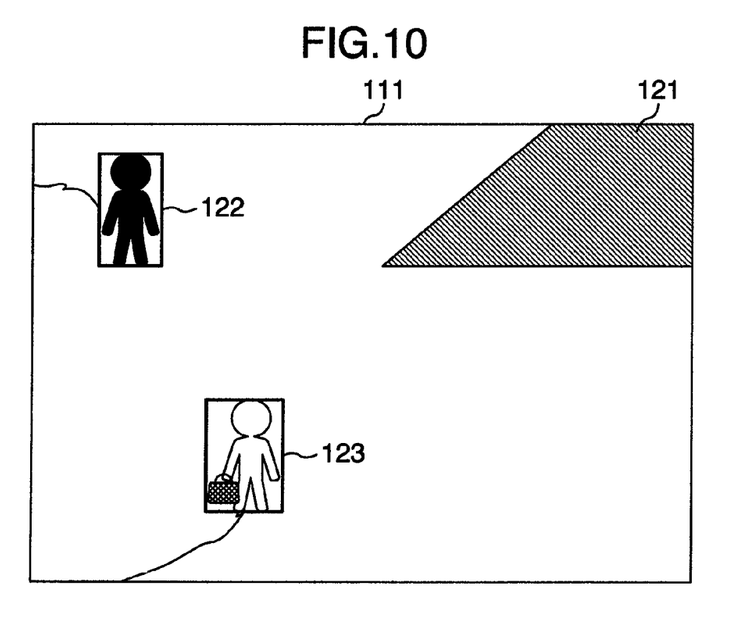
FIG. 10 is a diagram showing an example of an image displayed on the screen of a display device of a monitor system.
Figure 11:
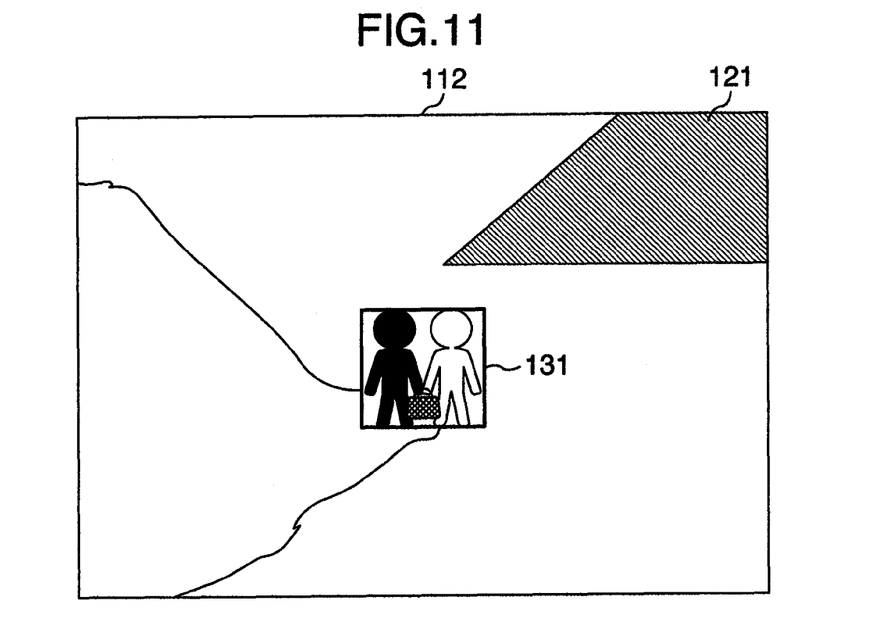
FIG. 11 is a diagram showing an example of an image displayed on the screen of a display device of a monitor system.
Figure 12:
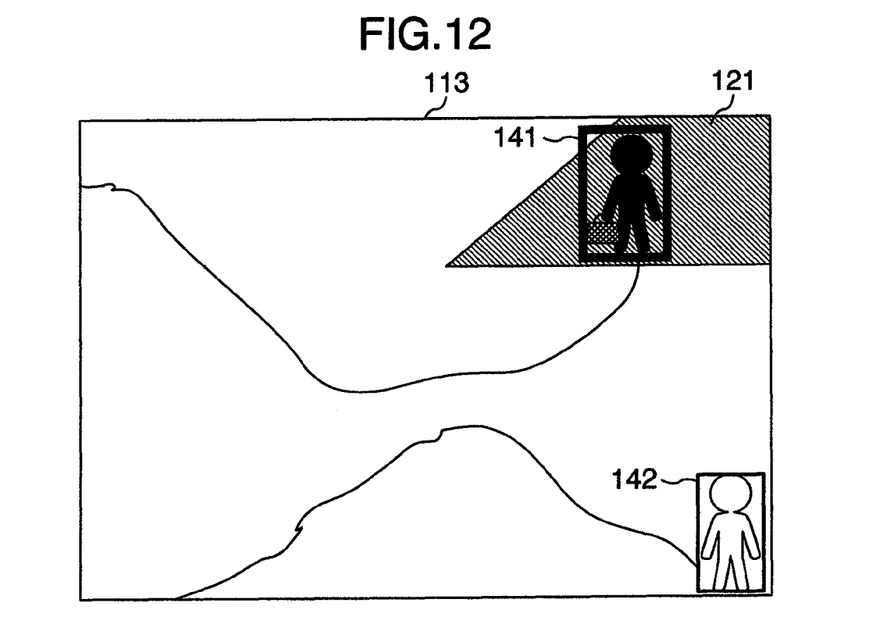
FIG. 12 is a diagram showing an example of an image displayed on the screen of a display device of a monitor system.

With reference to FIGS. 10 to 12, a specific example of this issue will be described.

FIG. 10 shows an example of an image 111 displayed on a display device of a monitor system.

In this example, if an object is detected in a target monitor area picked up by an imaging apparatus, for example, a circumscribed rectangle and a locus of the object are displayed. An entrance inhibition area 121 is set in the target monitor area, and if an object enters this area, it is judged that the object is a suspicious object. A thickness or the like of a frame of a circumscribed rectangle of the suspicious object is changed to display the object so as to distinguish the suspicious object from a simply detected object (i.e., an object outside the entrance inhibition area 121).

The image 111 shows the monitor results of objects, objects 122 and 123, in the target monitor area. The entrance inhibition area 121 is set at the upper right of the target monitor area.

FIG. 11 shows an example of an image 112 displayed on the display device after some time lapse from the state shown in FIG. 10.

Two objects 122 and 123 detected in FIG. 10 contact. In this case, the two objects are detected as one object 131.

FIG. 12 shows an example of an image 113 displayed on the display device after some time lapse from the state shown in FIG. 10.

An object 141 enters the entrance inhibition area 121. In this case, the object 141 and an object 142 are detected. Although the object 141 is judged suspicious because it enters the entrance inhibition area 121, the object 142 is not judged suspicious.

With this conventional method, for example if it is be judged from a position of an object whether the object is suspicious, this judgement is performed for each individual detected object. It is therefore necessary that a guard visually confirms another associated object (in the above example, the object passed a baggage) other than the object judged suspicious.

SUMMARY OF THE INVENTION

The present invention has been made under these conventional circumstances, and an object of the present invention is to provide an image processing apparatus and an image processing method capable of associating a plurality objects in an image with each other and, for example, judging suspicious another object relating to a suspicious object in an image.

According to one aspect of the present invention achieving the above object, an image processing apparatus for performing image processing has the following configuration.

Namely, object detecting means detects an object contained in an image. Associating means associates a plurality of objects detected with the object detecting means, with each other.

Accordingly, a plurality of objects in an image can be associated with each other, and the association results can be utilized.

The image may use various images. For example, an image photographed with imaging means (e.g., a camera) may be used. If a change in an image in a plurality of frames is to be detected or the like, a moving image changing with time in a plurality of frames may be used, or a plurality of still images or the like arranged sequentially in the order of photographed time may be used.

As an object in an image, an image (a partial image in one frame) of an object in the image is detected.

Various method for detecting an object in an image may be used. For example, a subtraction method may be used by which a pixel value difference is detected between an image to be detected and a background image, and a cluster of pixels having the difference value not smaller than a threshold value (or larger than the threshold value) is detected as one object.

It is also possible, for example, to detect only an object having one or more of a vertical length, a horizontal length, an area and the like not smaller than a predetermined size (or larger than the predetermined size), or not larger than the predetermined size (or smaller than the predetermined size), or to detect only an object having a size in a predetermined range. In this manner, it becomes possible to detect as an object a specific object (and an object having a similar size) such as a person, an animal, and a car.

The conditions of associating a plurality of objects with each other may use various conditions.

The number of objects to be associated may take various numbers of 2 or larger.

Association storing means may be provided which stores association results of a plurality of objects in a table format or the like in a memory.

An image processing apparatus of the present invention has the following configuration as an example of a preferred configuration.

Namely, evaluating means evaluates each object detected with the object detecting means, and association evaluating means evaluates another object associated by the associating means with the object evaluated by the evaluating means, in accordance with the evaluation made by the evaluating means.

Accordingly, an object associated with some object is evaluated in accordance with the evaluation of some object. Therefore, for example, it is possible to judge an object associated with a suspicious object in an image can be judged suspicious.

Evaluation given to an object may be various. For example, evaluation of whether an object is doubtful (suspicious), a danger degree (level) and the like may be used.

An object evaluating method may use various methods. For example, a condition that an object entered a predetermined area is given a predetermined evaluation, a condition that an object having a predetermined motion speed or direction is given a predetermined evaluation, a condition that an object having a resident time in a predetermined area is given a predetermined evaluation, and other conditions are set in advance. In accordance with the preset conditions, an object can be evaluated.

For example, it is possible to identify an object in an image detected with various sensors such as an infrared sensor and give the object a predetermined evaluation.

For example, evaluation storing means may be provided which stores evaluation given to an object in a table format or the like in a memory.

A method of evaluating an object in accordance with evaluation given to some object may use various methods. For example, the same evaluation as that of some object may be given. Alternatively, evaluation similar to that of some object may be given, such as evaluation lower or higher by one level than the evaluation of some object.

An image processing apparatus of the present invention has the following configuration as an example of a preferred configuration.

Namely, the associating means associates the plurality of objects with each other, in accordance with one or more of a case in which a plurality of objects are coupled to one object, a case in which one object is separated into a plurality of objects, and a case in which distances among a plurality of objects become shorter than a predetermined threshold value (e.g., not larger than the predetermined threshold value or smaller than the threshold value).

Accordingly, it is possible to associate a plurality of objects coupled to one object, with each other, a plurality of objects branched from one object, with each other, and a plurality of objects became near to each other, with each other.

More specifically, for example, it is possible to associate a person and a car with each other if the person rides in the car (coupling case), to associate persons with each other if a person contacts another person and receive a baggage (coupling case), to associate a person and a car with each other if the person steps out of the car (branching case), to associate a person and a baggage with each other if the person leaves the baggage, to associate persons with each other if a person comes near another person and speaks with another person (proximity case), and etc.

A position of an object may use the center of gravity position of an object image or another position.

A distance between objects may be a distance between a position of one object and a position of another object.

That a plurality of objects are coupled to one object may be detected, for example, from that a plurality of object images are coupled to one object image or that distances of a plurality of objects become zero (0).

The case in which distances of a plurality of objects become zero may includes the case in which a plurality of objects come near each other. Alternatively, it may distinguish between coupling when distances of a plurality of objects become zero and proximity when distances of a plurality of objects are larger than zero and not larger than a predetermined value (or smaller than the predetermined value).

The present invention may be provided as a method, a program, a recording medium or the like.

In the method of the present invention, each means execute various processes in the apparatus or system.

In the program of the present invention, a computer constituting the apparatus or system functions as various means.

A recording medium of the present invention stores a program to be executed by the computer constituting the apparatus or system and to be readable by input means of the computer. The program makes the computer execute various procedures (processed)

As described above, according to the image processing apparatus of the present invention, a plurality of objects in an image can be associated with each other. For example, it is possible to judge that an object associated with a suspicious object in the image can also be judged suspicious. The present invention is effective by applying particularly to a monitor system.

Other objects, features and advantages of the invention will become apparent from the following description of the embodiments of the invention taken in conjunction with the accompanying drawings.

DESCRIPTION OF THE EMBODIMENTS

Embodiments of the present invention will be described with reference to the accompanying drawings. Like elements are represented by similar reference symbols.

Figure 1:
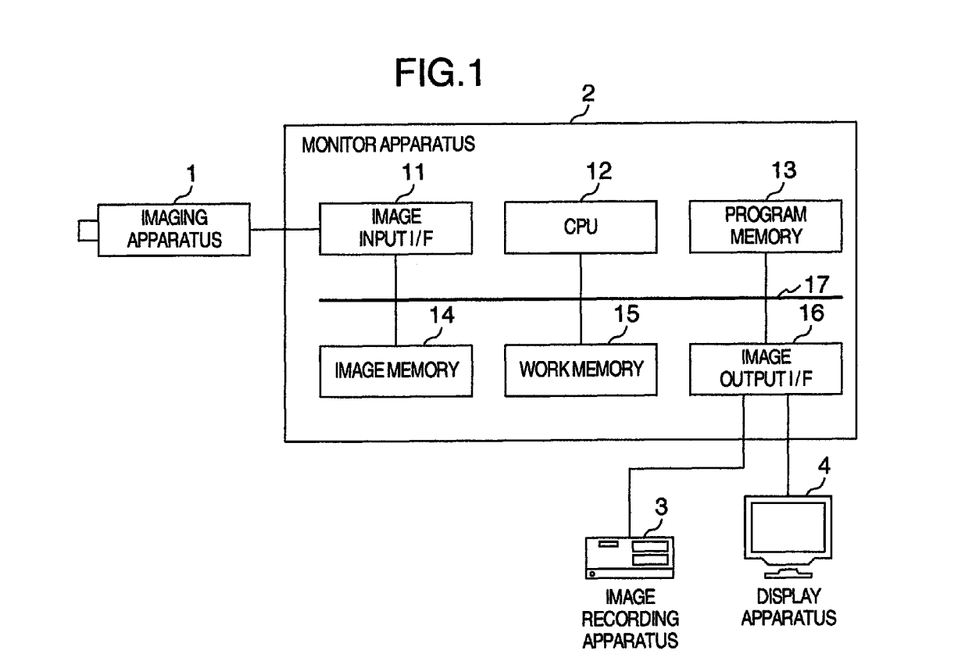
FIG. 1 is a diagram showing an example of the configuration of a monitor system according to an embodiment of the present invention.

FIG. 1 shows an example of the configuration of hardware of a monitor system according to an embodiment of the present invention.

The monitor system of the embodiment has an imaging apparatus 1 constituted of, e.g., a camera, a monitor apparatus 2, an image recording apparatus 3 and a display apparatus 4.

The monitor apparatus 2 has an image input interface (I/F) 11, a central processing unit (CPU) 12, a program memory 13, an image memory 14, a wok memory 15, an image output interface (I/F) 16 and a data bus 17.

The imaging apparatus 1 is connected to the image input I/F 11, and the image recording apparatus 3 and display apparatus 4 are connected to the image output I/F 16.

The image input I/F 11, CPU 12, program memory 13, image memory 14, work memory 15 and image output I/F 16 are interconnected by the data bus 17.

Description will be made on an example of the operation to be performed by the monitor system of the embodiment.

The imaging apparatus 1 photographs an image of an area to be monitored (target monitor area). The imaging apparatus 1 converts a picked-up image into an image signal, and outputs the image signal to the image input I/F 11.

The image input I/F 11 converts the image signal input from the imaging apparatus 1 into image data of a format (e.g., 640 horizontal pixels and 480 vertical pixels) used by the monitor system, and sends the image data to the image memory 14 via the data bus 17.

The image memory 14 stores image data sent from the image input I/F 11.

CPU 12 analyzes image data stored in the image memory 14 by using the work memory 15, in accordance with an operation program stored in the program memory 13.

From this analysis result, information is obtained such as information representative of detection of an object in a photographing visual field of the imaging apparatus 1 and other information.

The work memory 15 stores a table (object association table) for storing information when an object is detected (detected object information) and object associated information.

The detected object information includes, for example, a name of a detected object, a detected time, an area of the object, an object type such as "person" and "car", and a suspicious degree attribute (danger attribute).

CPU 12 sends information to the image recording apparatus 3 via the data bus 17 and image output I/F 16, and the image recording apparatus 3 stores the received information.

In this manner, the image recording apparatus 3 stores, for example, information on an image as a processing result and detected object information.

The image recording apparatus 3 stores information supplied from the monitor apparatus 2.

CPU 12 sends information to the display apparatus 4 via the data bus 17 and image output I/F 16, and the display apparatus displays the received information. In this manner, the display apparatus 4 displays, for example, an image as a processing result.

The display apparatus 4 displays information supplied from the monitor apparatus 2 on its screen, and displays for example an image as an object detection result.

The image output I/F 16 converts, for example, a signal from CPU 12 into a signal having a format (e.g., NTSC video signal) capable of being used by the display apparatus 4, and sends the converted signal to the display apparatus 4.

Next, detailed description will be made on image processing to be performed by the monitor system of the embodiment. Image processing is performed by CPU 12, and displaying an image and the like is performed by the display apparatus 4.

In this embodiment, as shown in FIGS. 10 to 12, the monitor apparatus 2 can set an entrance inhibition area 121 in a target monitor area, judges suspicious (dangerous) an object entered the entrance inhibition area 121, and displays information to this effect on the display apparatus 4.

An alarm level may be set to each entrance inhibition area 121, to change a display style (e.g., thickness, color and the like of a line) of the display apparatus 4 for each area or an object entered the area, in accordance with the alarm level.

Also in the configuration of the embodiment, although an object entered the entrance inhibition area 121 is judged suspicious, other configurations may be applied to judge an object suspicious in accordance with various operations of the object such as a motion speed of the object and a motion direction of the object.

More specifically, an object moving (in an opposite direction) from left to right among nearby objects moving from right to left may be judged suspicious, or an object having a time (resident time) resident in a predetermined area not shorter than a predetermined threshold value may be judged suspicious.

In another configuration example, an object detected with various sensors may be identified in an image to judge this object suspicious.

Information of the danger degree attribute may be, for example, information representative of absence/presence of danger, and information representative of a danger degree (level) such as high, middle and low danger degrees. In specific examples, a plurality of areas may be set to set presence/absence of danger and a danger level for each area, or to set presence/absence of danger and a danger level in accordance with a magnitude of a motion speed, a motion direction, a resident time and the like.

Figure 2:
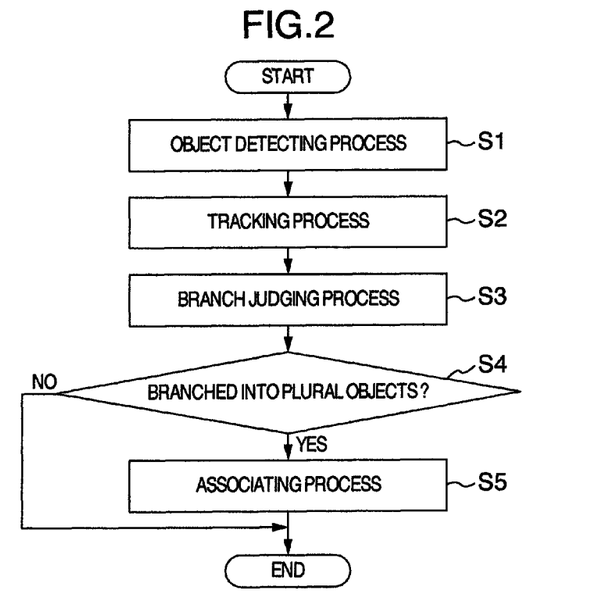
FIG. 2 is a diagram illustrating an example of the procedure of a process of associating a plurality of objects with each other by using the results of an object detecting process.

FIG. 2 shows an example of the procedure of a process of associating a plurality of objects with each other by using the results of an object detecting process, in the monitor system of the embodiment.

At an object detecting Step, by using an input image photographed with the imaging apparatus 1, the monitor apparatus 2 executes a process of detecting an object in the target monitor area, by using a method such as a subtraction method illustrated in FIGS. 8 and 9 (Step S1).

At a tracking Step, a process is executed to track an object detected at the object detecting Step (Step S2).

An example of the object tracking process will be described with reference to FIGS. 3A to 3C.

In the tracking process of this example, a detected object is tracked in accordance with a position change in a cluster of pixels in a binarized image detected for each processing frame (for each input image).

Figure 3A:
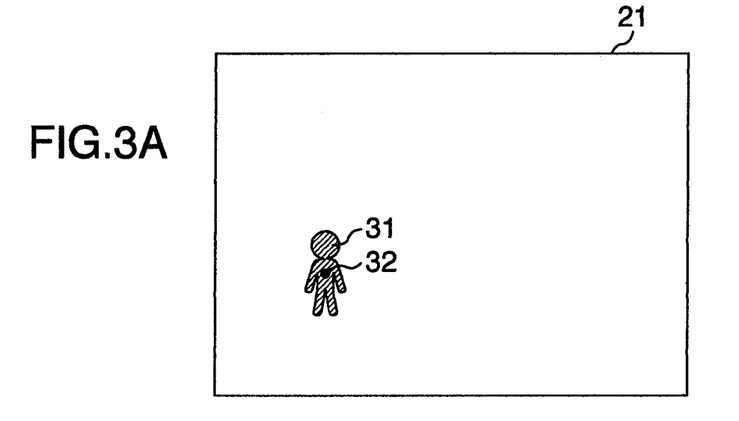
FIGS. 3A to 3C are diagrams illustrating an example of an object tracking process.
Figure 3B:
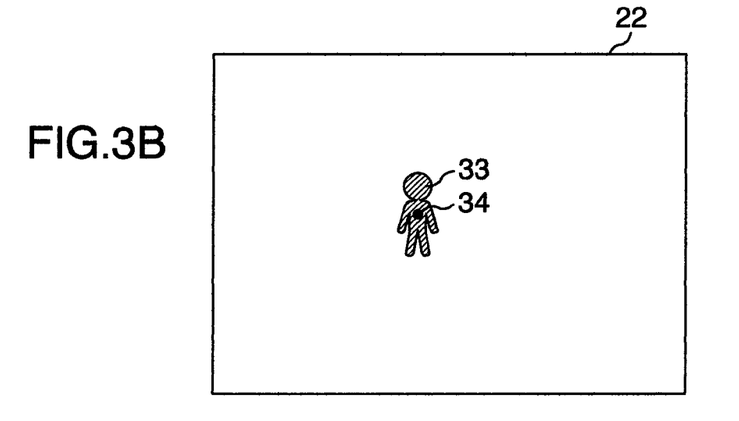

FIGS. 3A and 3B show binarized images 21 and 22 obtained in the processing frames at consecutive times (t0−1) and (t0). A process is executed to track an object detected in the binarized images at these consecutive processing frames.

More specifically, in the binarized image 21 at time (t−0) shown in FIG. 3A, an object 31 is detected, whereas in the binarized image 22 at time (t0) shown in FIG. 3B, an object 33 is detected. As centers of gravity points of the detected objects 31 and 33, inner points 32 and 34 of the detected objects 31 and 33 are obtained.

In this example, the detected object is tracked in accordance with the position of the center of gravity. More specifically, by using as a start point the center of gravity point 34 of the detected object 33 obtained in the processing frame at time (t0), a center of gravity point (in this example, the center of gravity point 32 of the detected object 31) at the nearest position from the start point is selected as the center of gravity point of the detected object (there is a possibility of two or more objects) obtained at time (t0) before time (t0−1). A line 35 is drawn interconnecting these centers of gravity points 32 and 34.

Figure 3C:
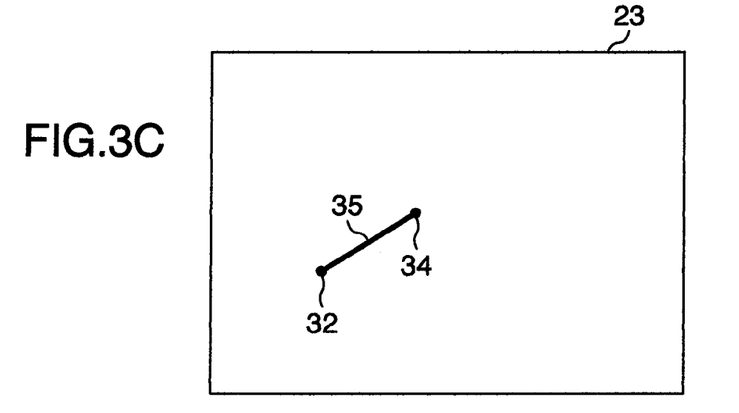

As shown in an image 23 of FIG. 3C, this line 35 is a locus of the detected object (the objects 31 and 33 regarded as the same object).

At a branch judging Step, a process is executed to judge whether there is any branch of the detected object (Step S3).

The branch judging process will be described with reference to FIG. 4.

Figure 4:
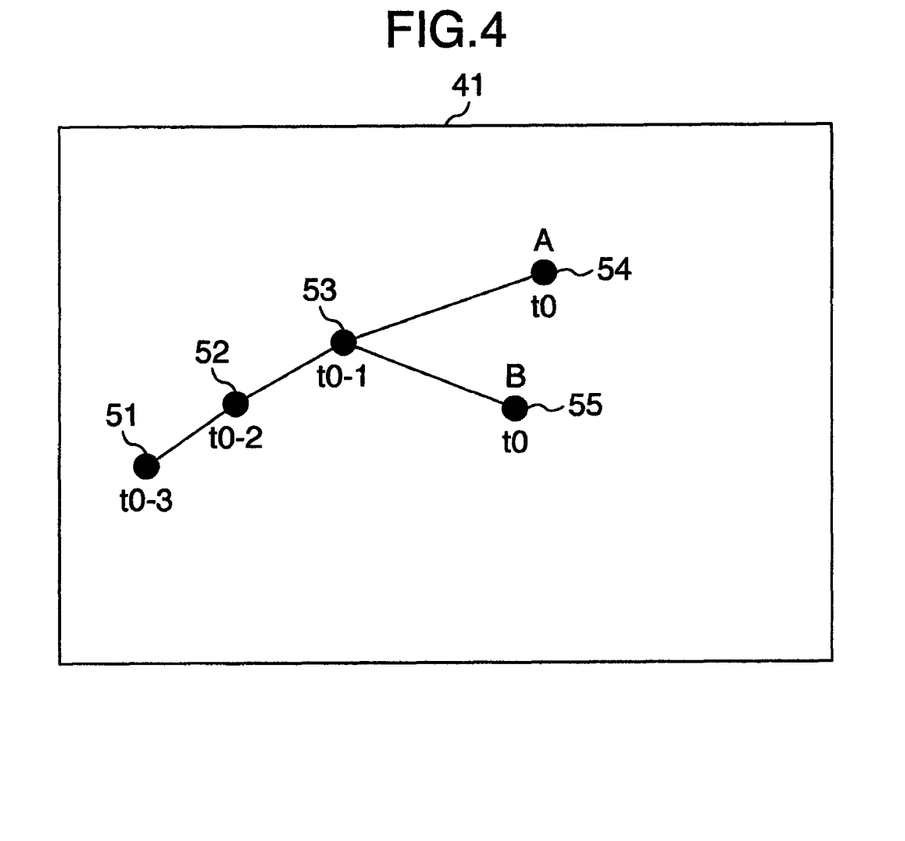
FIG. 4 is a diagram illustrating a branch judging process.

FIG. 4 shows an image 41 indicating a tracking result (line) and the centers of gravity positions 51 to 55 of objects obtained by using binarized images in the processing frames at four consecutive times (t0−3), (t0−2), (t0−1) and (t0).

Although one object of the detected objects 51, 52 and 53 is tracked at first three times (t0−3), (t0−2) and (t0−1), two detected objects 54 and 55 (objects A and B) are tracked at fourth time (t0).

If the result of the tracking Step shows tracking two or more detected objects 54 and 55 from one object of the detected objects 51 to 53, it is judged that one detected object moves being divided into a plurality of detected objects.

More specifically, it is judged whether a result of the branch judging Step shows that one detected object is branched to a plurality of detected objects (Step S4). If it is judged that one detected object branched to a plurality of detected objects, a process of associating detected objects with each other is executed as an associating Step (Step S5).

Figure 5:
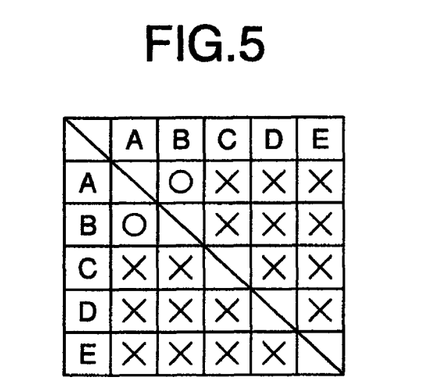
FIG. 5 is a diagram showing an example of an object association table.

FIG. 5 shows an example of an object association table for storing association of detected objects. The object association table is stored, for example, in the work memory 15 or the like.

As shown in FIG. 5, in the object association table of this example, an object name (such as A, B, C and etc) is written in the uppermost row and leftmost column. The table is updated in such a manner that by using as a reference each object name written in the leftmost column, a "circle" is written in a record crossing the column of the object name associated with the reference object name and a "cross" is written in other records.

More specifically, at the associating Step of this example, in accordance with the result of the branch judging Step, it is judged that one object branched into the objects A and B. It is therefore judged that the object A is associated with the object B, and the "circle" is written in two records where the objects A and B cross in the object association table.

Figure 6:
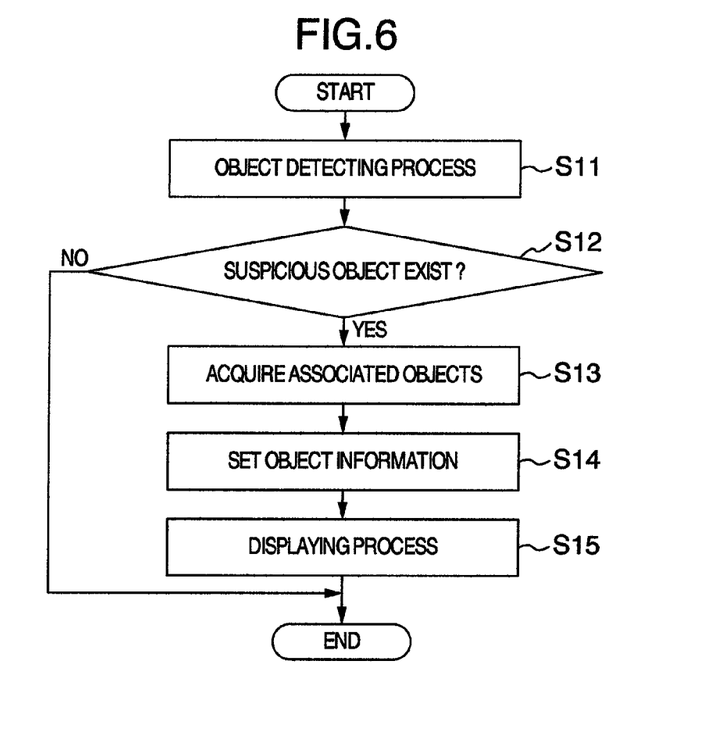
FIG. 6 is a diagram illustrating an example of the procedure of a process of judging also an object associated with an object judged suspicious.

FIG. 6 is a diagram illustrating an example of the procedure of a process of judging also an object associated with an object judged suspicious, in the monitor system of the embodiment.

At an object detecting Step (S11), by using an input image photographed with the imaging apparatus 1, the monitor apparatus 2 executes a process of detecting an object in the target monitor area, by using a method such as the subtraction method illustrated in FIGS. 8 and 9.

It is judged from the result of the object detecting Step (S11) whether there is a suspicious object (Step S12). Namely, an object detected at Step S11 is evaluated. In this example, as shown in FIGS. 10 to 12, the object 141 entered the entrance inhibition area 121 is detected as a suspicious object.

At an associated object acquiring Step (S13), another object associated with the object judged suspicious is obtained by referring to the object association table (FIG. 5).

For example, if the detected object A is a suspicious object, information on that an object associated with the detected object A is the detected object B, is acquired from the object association table shown in FIG. 5.

In the configuration of the monitor system of the embodiment, although a plurality of associated objects are acquired by using the object association table, in another configuration, the locus as the result of the object tracking process may be used as a search tree, and if another node can be reached by tracing the locus (a path in the search tree) of some object (a node in the search tree), then the object and the object corresponding to the other node can be associated with each other.

At an object information setting Step (S14), a process is executed to set information indicating that an object associated with the suspicious object acquired at the associated object acquiring Step (S13) is a suspicious object. Namely, in accordance with the evaluation given at Step S12 to the object detected at Step S11, the associated object acquired at the associated object acquiring Step (S13) is evaluated as a suspicious object.

For example, if the detected object A is set with "danger degree: high" and the detected object B is set with "danger degree: low", respectively as the danger degree attribute in the detected object information stored in the work memory 15, the danger degree attribute of the detected object B is set also to "danger degree: high" to have the same danger degree as that of the detected object A, because the detected object B is associated with the detected object A.

At a displaying Step, the display apparatus 4 displays the information on the suspicious object set at the object information setting Step and an image of this object (Step S15).

Figure 7:
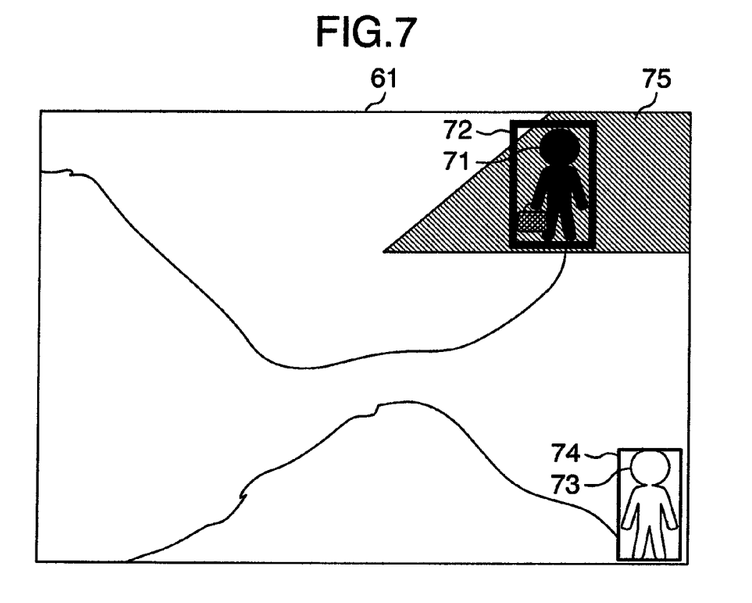
FIG. 7 is a diagram showing an example of a result of a process of displaying a screen of associating a plurality of objects with each other.

FIG. 7 shows an example of an image 61 as a displaying process result of an object 71 judged suspicious and its associated object 73.

The object 71 (object A) is judged suspicious because this object enters the entrance inhibition area 75. The other object 73 (object B) is also judged suspicious similar to the suspicious object 71, because the object 73 is associated with the suspicious object 71 although the object 73 does not enter the entrance inhibition area 75.

The range (outer frame) 74 of the associated object 73 is drawn, for example, by a heavy line indicating that the danger degree attribute is "danger degree: high", similar to the range (outer frame) 72 of the suspicious object 71.

In this example, although the same display style is used for both the object judged suspicious and the object judged to be associated with the suspicious object, in another configuration example, the display style may be made different for these objects. For example, the range 74 of the associated object 73 may be displayed in a different display style from that of the range 72 of the suspicious object 71, so that it is possible to know that the object 73 is an object associated with the suspicious object 71.

With the processes described above, it becomes possible to associate a plurality of objects with each other. Further, if it is judged that one of a plurality of associated objects is judged suspicious, it is possible to judge all other associated objects suspicious.

Conventionally, a guard views the past images recorded in an image recording apparatus to find another object associated with the suspicious object and confirm whether the other object is a suspicious object. In this embodiment, a suspicious object can be presented effectively to a guard.

Although the embodiment shows the configuration that if one detected object is separated into a plurality of detected objects, the plurality of detected objects are associated with each other, an another configuration example may be used in which if a plurality of detected objects are coupled to one detected object, and the plurality of detected objects can be associated with each other. As another embodiment in which one detected object is separated into a plurality of detected objects, association can be performed for the case wherein like a person left out of a car (detected object) stopped after running, a detected object (another detected object) having a size different from that of the detected object is derived.

In another configuration example, if distances between a plurality of detected objects (e.g., distances between centers of gravity points) become not larger than (or smaller than) a predetermined threshold value, the plurality of detected objects can be associated with each other.

That a plurality of detected objects are coupled to one detected object can be detected, for example, from that clusters of pixels of a plurality of detected objects change to one cluster by labelling or from that distances among a plurality of detected objects become zero (0).

That one detected object is separated into a plurality of detected objects may be detected by various methods. For example, that one detected object is separated into a plurality of detected objects can be detected, if a plurality of detected objects are detected in some frame at the positions (e.g., centers of gravity positions) whose distances from a position of one detected object in the previous frame are not larger than (or smaller than) a predetermined threshold value, and if the plurality of detected objects are not collected from the surrounding.

Further, that a plurality of detected objects are coupled to one detected object may be detected by various methods. For example, that a plurality of detected objects are coupled to one detected object can be detected, if one detected object is detected in some frame at the position whose distance from positions of a plurality of nearby detected objects is not larger than (or smaller than) a predetermined threshold value, and if the plurality of original detected objects are not moved to the surrounding.

As described above, the monitor system of the embodiment has the imaging apparatus 1 for photographing an image of the target monitor area, the monitor apparatus 2 for processing an image photographed with the imaging apparatus 1 and collecting monitor information on the inside of the target monitor area, the image recording apparatus 3 for recording the image photographed with the imaging apparatus 1, and the display apparatus 4 for displaying at least one of the image photographed with the imaging apparatus and the monitor information collected by the monitor apparatus 2. The monitor apparatus 2 has an object detecting function of detecting monitor information regarding an image of an object contained in the image and an associating function of associating two or more objects detected by the object detecting function, with each other.

Various information on monitoring such as information on detection of an object may be used as the monitor information.

In the monitor system of the embodiment, the associating function has an object tracking function of tracking an object detected by the object detecting function and a branch judging function of judging whether one object is branched into a plurality of objects, in accordance with the track results of the object tracking function, to thereby associate two or more objects branched from one object with each other. Alternatively, it is also possible to associate a plurality of objects with each other if the plurality of objects are coupled to one object. Furthermore, it is also possible to associate a plurality of objects with each other, if the plurality of objects come near to each other and distances of the plurality of objects become not larger than a predetermined threshold value (or smaller than the predetermined threshold value).

The monitor system of the embodiment has a detected object judging function of judging whether a suspicious object is detected, in accordance with the detection results by the object detecting function, and an associated object setting function of setting that an object associated with the suspicious object is also a suspicious object, in accordance with the results by the detected object judging function and the associating function.

The associating function of the monitor system of the embodiment manages association of a plurality of objects by using the object association table.

According to the monitor system of the embodiment, the monitor apparatus 2 judges whether a plurality of objects is associated with each other, by using the results of the object detecting process, and in accordance with the judgement results, stores association information on the plurality of objects in the object association table. When a suspicious object is detected, an object associated with the suspicious object is acquired by referring to the object association table, information that the associated object is also a suspicious object is set, and for example, information on all suspicious objects and a processed image are displayed on the screen of the display apparatus 4.

Accordingly, the monitor system of the embodiment can monitor other objects associated with a detected object by associating the other objects with each other. For example, an object associated with an object judged suspicious can also be judged suspicious, and suspicious objects can be presented effectively to a guard. In the embodiment, therefore, information on objects monitored and detected in the target monitor area can be presented effectively to the guard.

In the monitor system of the embodiment, imaging means for photographing an image is constituted of the function of the imaging apparatus 1, an image processing apparatus for performing image processing is constituted of the function of the monitor apparatus 2, video recording means for recording video data (image recording means for recording an image) is constituted of the function of the image recording apparatus 3, and displaying means for displaying information such as an image is constituted of the function of the display apparatus 4.

In the monitor apparatus (image processing apparatus) 2 of the embodiment, the function of making CPU 12 perform image processing and the like constitutes object detecting means for detecting an object in an image, associating means for associating a plurality of objects with each other, evaluating means for evaluating an object (e.g. evaluating suspicious or the like), and association evaluating means for evaluating an associated object in accordance with evaluation of the associating object.

In the monitor apparatus (image processing apparatus) 2 of the embodiment, association storing means is constituted of the function of storing association results of a plurality of objects in the object association table shown in FIG. 5 in the memory, and evaluation storing means is constituted of the function of storing evaluation (e.g., information on a danger degree attribute) of an object in the memory.

The structures of the system and apparatus of the present invention are not necessarily limited to those described above, but various structures may be adopted. The present invention may be provided, for example, as a method or scheme for executing the processes of the present invention, as a program realizing the method or scheme, as a recording medium storing the program, or the like. The present invention may be provided as various systems and apparatus.

An application field of the present invention is not necessarily limited to those described above, but the present invention is applicable to various fields.

Various processes to be executed by the system, apparatus and the like of the present invention may adopt, for example, the configuration that in hardware resources including a processor, a memory and the like, the processes are controlled by making the processor execute a control program stored in a read-only memory (ROM), or each functional means for executing the processes may be constituted of an independent hardware circuit.

The present invention may be regarded as a computer readable storage medium storing the control program such as a floppy (registered trademark) disc and a compact disc (CD)-ROM and the control program as such. The processes of the present invention can be executed by inputting the control program from the recording medium to a computer and making the processor execute the control program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
   object detecting means for detecting each object of a plurality of objects contained in a plurality of images arrayed in order of points in time at which said images are taken, respectively;
   tracking means for tracking an object by connecting two objects which are respectively detected from two images taken at different points in time among said plurality of images and which can be considered to be a same object;
   associating means for associating said plurality of objects with each other based on a result of tracking objects by said tracking means;
   evaluating means for giving evaluations to said each object detected with said object detecting means, respectively; and
   association evaluating means for giving an evaluation to another object which has been associated by said associating means with the object to which the evaluation has been given by said evaluating means, based on the evaluations made by said evaluating means,
   wherein said associating means executes association when one or more of the following conditions occur including a condition of associating objects in a case in which said objects are coupled into one object, a condition of associating objects in a case in which one object is separated into said objects, and a condition of associating objects in a case in which distances among said objects become shorter than a predetermined threshold value.

2. The image processing apparatus according to claim 1, further comprising:
displaying means for displaying said each object detected with said object detecting means in a display style representative of association of said plurality of objects.

3. The image processing apparatus according to claim 1, wherein said predetermined judgment criterion includes whether each of said objects exists in a specific area of the image.

4. The image processing apparatus according to claim 1, wherein the evaluations made by the evaluating means include a level of danger or suspicion, and
wherein the association evaluating means is configured to give an evaluation to another object (A) which has been associated with the object (B) to which the evaluation has been given by said evaluating means, said evaluation given to said another object (A) having a lowered level of danger or suspicion than said evaluation given to said object (B).

5. The image processing apparatus according to claim 4, further comprising:
image recording means for storing said plurality of images and detected-object information including respective times of detection of the detected objects and evaluations for the detected objects;
display processing means for displaying said detected objects by drawing said detected objects in a display style corresponding to the evaluations given to said detected objects,
wherein said object detecting means is configured to detect, as said objects, clusters of pixels detected from binary images each obtained by processing said plurality of images,
wherein said evaluating means is configured to either give a predetermined evaluation to the detected object which entered a predetermined area, give a predetermined evaluation to the detected object which has a predetermined motion speed or moving direction, or give a predetermined evaluation to the detected object which stayed in a predetermined area for a predetermined period of time, and
wherein said associating means is configured to store the associations of said plurality of objects into said image recording means as a table or a search tree.

6. The image processing apparatus according to claim 4, wherein one detected object is separated into a plurality of detected objects can be detected, if a plurality of detected objects are detected in some frame at the positions whose distances from a position of one detected object in the previous frame are not larger than, or smaller than, a predetermined threshold value, and if the plurality of detected objects are not collected from the surrounding.

7. The image processing apparatus according to claim 1, further comprising:
image recording means for storing said plurality of images and detected-object information including respective times of detection of the detected objects and evaluations for the detected objects;
display processing means for displaying said detected objects by drawing said detected objects in a display style corresponding to the evaluations given to said detected objects,
wherein said object detecting means is configured to detect, as said objects, clusters of pixels detected from binary images each obtained by processing said plurality of images,
wherein said evaluating means is configured to either give a predetermined evaluation to the detected object which entered a predetermined area, give a predetermined evaluation to the detected object which has a predetermined motion speed or moving direction, or give a predetermined evaluation to the detected object which stayed in a predetermined area for a predetermined period of time, and
wherein said associating means is configured to store the associations of said plurality of objects into said image recording means as a table or a search tree.

8. The image processing apparatus according to claim 1, wherein one detected object is separated into a plurality of detected objects can be detected, if a plurality of detected objects are detected in some frame at the positions whose distances from a position of one detected object in the previous frame are not larger than, or smaller than, a predetermined threshold value, and if the plurality of detected objects are not collected from the surrounding.

9. An image processing method comprising the steps of:
detecting each object of a plurality of objects contained in a plurality of images arrayed in order of points in time at which said images are taken, respectively;
tracking an object by connecting two objects which are respectively detected from two images taken at different points in time among said plurality of images and which can be considered to be a same object;
associating said plurality of objects with each other based on a result of tracking objects by said tracking step;
evaluating said each object detected with said detecting step, respectively; and
evaluating another object which has been associated by said associating step with the object to which the evaluation has been given by said evaluating objects step, based on the evaluations made by said evaluating another object step,
wherein said associating step executes association when one or more of the following conditions occur including a condition of associating objects in a case in which the objects are coupled into one object, a condition of associating of objects in a case in which one object is separated into said objects, and a condition of associating objects in a case in which distances among the objects become shorter than a predetermined threshold value.

10. The image processing method according to claim 9, further comprising a step of:
displaying said each object detected at said object detecting step in a display style representative of association of said plurality of objects.

11. The image processing method according to claim 9, wherein said predetermined judgment criterion includes whether each of said objects exists in a specific area of the image.

12. A computer program embodied on a non-transitory computer readable medium having computer readable program code means embodied in said medium for processing an image, said computer readable program code means when executed causes a computer to perform the steps of:

detecting each object of a plurality of objects contained in a plurality of images arrayed in order of points in time at which said images are taken, respectively;

tracking an object by connecting two objects which are respectively detected from two images taken at different points in time among said plurality of images and which can be considered to be a same object;

associating said plurality of objects with each other based on a result of tracking objects by said tracking step;

evaluating said each object detected with said detecting step, respectively; and evaluating another object which has been associated by said associating step with the object to which the evaluation has been given by said evaluating objects step, based on the evaluations made by said evaluating another object step, wherein said associating step executes association when one or more of the following conditions occur including a condition of associating objects in a case in which the plurality of objects are coupled into one object, a condition of associating objects in a case in which one object is separated into said objects, and a condition of associating objects in a case in which distances among the objects become shorter than a predetermined threshold.

* * * * *